Figure 1:
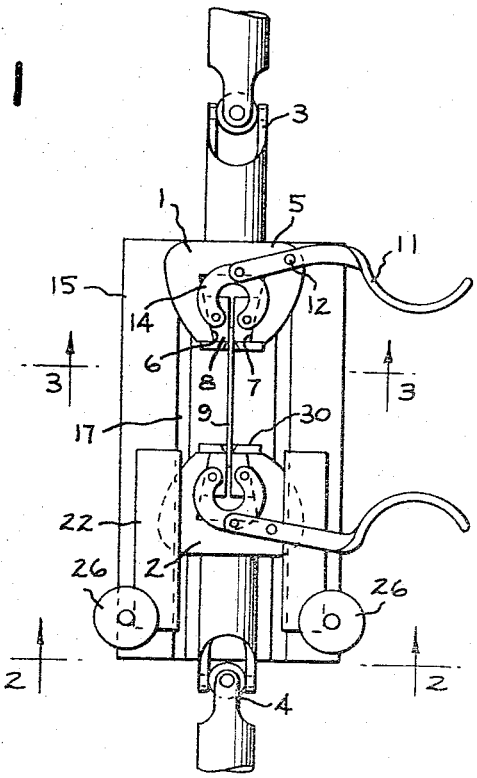

March 21, 1967     B. B. SCOTT ET AL     3,309,918
TEST SAMPLE HOLDING AND ALIGNMENT MEANS FOR
TENSILE TESTING MACHINES
Filed March 22, 1965

INVENTORS
BENJAMIN B. SCOTT
& KENNETH R. DAVIS
BY Walter E. Hule
THEIR ATTORNEY

United States Patent Office 3,309,918
Patented Mar. 21, 1967

3,309,918
TEST SAMPLE HOLDING AND ALIGNMENT
MEANS FOR TENSILE TESTING MACHINES
Benjamin B. Scott, Louisville, and Kenneth R. Davis, Anchorage, Ky., assignors to General Electric Company, a corporation of New York
Filed Mar. 22, 1965, Ser. No. 441,542
2 Claims. (Cl. 73—103)

The present invention relates to machines for testing the tensile strength of materials and is more particularly concerned with an improved sample or specimen holder including grips or clamps for anchoring the opposite ends of a test sample and so constructed as to maintain the grips and sample in accurate alignment for true axial loading of the sample during the entire test procedure.

Well-known forms of universal testing machines comprise vertically spaced grips for anchoring the two ends of a test sample and applying a tensile force to the sample during the testing thereof. In the tensile testing of many materials using available machines of this type, the test results have been found to be very erratic with the data on various samples of the same material spreading over a very wide range. These inaccuracies have been largely due to bending forces on the samples due to misalignment of the jaws or grips during the testing operation. In the testing of thermoset resin and other high modulus materials, misalignment of the two grips may result in subjecting one edge of the sample to a tensile force almost equal to its tensile strength long prior to the actual application of the tensile load which it should support.

Equally detrimental are the various effects of the sample misalignment on the determination of accurate Young modulus of elasticity data. It has been shown that prior to the application of the tensile load, a sample can actually go into compression on one side and tension on the other due to bending effects resulting from misalignment of the grips. This obviously results in erroneous data when conducting a tensile test. This problem can be observed by placing two SR-4 strain gages on either side of a test specimen and reading them as a function of the events that occur while conducting the tensile test in the usual tensile machine. In almost all cases, the strain gages actually record one side of the sample being in compression and the other side of the sample being in tension. Since modulus is the slope of the line of the relationship of stress to strain, any error in slope at the beginning of the stress strain curve results in major errors in modulus calculations.

One of the most dramatic ways to observe the effects of induced bending of the sample due to the misalignment is through photoelastic analysis such as birefringence. By placing a clear resin sample, such as a thin epoxy or polyester sample, in the testing machine without due care to alignment, the induced stresses due to misalignment show up very vividly as fringe orders of various magnitude and intensity within the sample. These fringe orders appear as gradients across the sample and follow the pattern of the induced stresses as diagonal lines which move across and down the specimen as the load increases.

On the other hand if the specimen is properly aligned, the sample will not show this fringe order gradient but will change color simultaneously across the width and length of the sample as the stress increases while applying the tensile load.

The present invention has as its primary object the provision of an improved, low cost specimen holder for tensile testing machines so constructed as to maintain the two grips in accurate alignment to prevent bending effects during the tensile testing of rigid materials.

Another object of the invention is to provide a sample or specimen holder for use with available tensile testing machines designed to maintain alignment of the test sample centroidal axis with the tensile loading axis and thus uniformly distribute the tensile load throughout the sample cross-section during the testing thereof.

A further object of the invention is to provide a specimen holder for tensile testing machines designed to insure axial relative movement of the two grips and to align the test sample coaxially with forces applied by that movement.

Further objects and advantages of the present invention will become apparent as the following description proceeds and the features of novelty which characterize the invention will be pointed out with particularity in the claims annexed to and forming a part of this specification.

In accordance with the illustrated embodiment of the present invention, there is provided an improved tensile testing machine including a specimen holder including a fixed grip or clamp and a movable grip or clamp both of which are connected to the tension producing components of the machine through universal or swivel joints. For accurately positioning the test sample the two grips and for maintaining the grips in axial alignment during the operation of the test machine, the upper grip is rigidly secured to the upper end of a base plate which includes means for slidably receiving and supporting the lower grip to substantially restrict movement thereof in all directions relative to the upper grip except in an axial direction. In the preferred embodiment of the present invention, this is accomplished by providing a pair of spaced vertically extending grooves in the base plate which receive and guide spaced runners on the lower grip and side channels secured to the base frame for maintaining the lower grip in operating position relative to the grooves. Preferably the facing or clamping ends of the two grips also include positioning means adjacent the plate for accurately centering the test sample relative to the jaw portions of the grips while counterweights extending forwardly from the base plate are provided for counteracting the offsetting the weight of the base plate relative to the center axis of the grips in order to maintain the base plate in parallel with the axis of relative movement of the grips during operation of the test machine.

Figure 2:
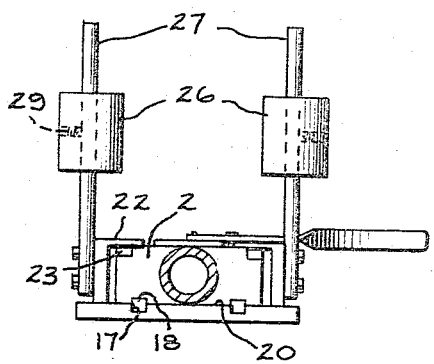
Figure 3:
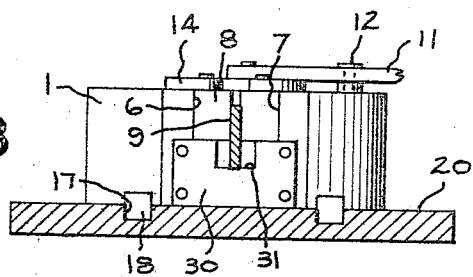

For a better understanding of the invention reference may be had to the accompanying drawing in which:
FIGURE 1 is an elevational view of the specimen holder of the present invention;
FIGURE 2 is a sectional view of the holder along line 2—2 of FIGURE 1; and
FIGURE 3 is a second sectional view of the holder along line 3—3 of FIGURE 1.

With reference to the accompanying drawing, the specimen or sample holder of the present invention comprises an upper grip 1 and a lower grip 2 respectively attached through universal joints 3 and 4 to the relatively movable tension producing elements of a universal testing machine. For example, the upper grip 1 is connected through the universal joint 3 to the movable draw rod of a universal testing machine while the lower grip 2 is connected through the universal joint 4 to the stationary or cross head portion of the machine.

Each of the grips may be of the well know type including a body portion 5 of a generally horseshoe shape having opposed walls 6 and 7 which slant relative to one another and converge towards the open end of the grip symmetrically with reference to the longitudinal axis of the tension force applied by the grips. A pair of jaws 8 of generally wedge shape slidably bear against the inclined walls 6 and 7 so that movement of the jaws toward the open end of the grip brings them together into clamping relationship with an end of the test specimen 9. A lever 11 pivoted intermediate its ends, as at 12, has its inner end connected by links 14 to the jaws 8 for retracting the jaws to permit insertion or removal of the sample 9.

In accordance with the present invention, the grips 1 and 2 are maintained in complete axial alignment for movement thereof along an axis concentric with the axis of the specimen 9 during operation of the test equipment by means including a base plate 15 rigidly secured at the upper end thereof to the upper grip 1. The lower end of the base plate 15 is provided with means for slidably receiving the lower grip 2 in such a manner as to restrict movement of the lower grip 2 relative to plate 15 and the upper grip 1 in all directions excepting in the longitudinal or axial direction. To this end, the base plate is provided with spaced, vertically-extending grooves 17 extending parallel to the axis of the test specimen 9 when clamped in the two grips and adapted to slidably receive runners 18 of Teflon or other low co-efficient of friction material secured to the rear face of the lower grip 2. In order to anchor the lower grip 2, or more specifically the runners 18 in the grooves 19, there is provided opposed side channels 22 overlying the side edges of the lower grip 2. Preferably the portions of the grip 2 in sliding enagagement with the surfaces of the channels 22 are also composed of Teflon inserts 23.

The grooves 17 and the channels 22 serve to prevent any horizontal movement of the lower grip 2 relative to the upper grip 1 both during the mounting of the specimen in the holder and during operation of the testing machine. In other words the lower grip 2 is capable of moving only longitudinally relative to the base 15 or in other words along a vertical path defined by the axis of the two grips and the specimen 9.

For the purpose of counterbalancing the weight of the plate 15 which is positioned rearwardly of the grips 1 and 2 or in other words rearwardly from the axis of the tensile forces applied to the test specimen 9, there is provided a pair of counterweights 26 riding on arms 27 extending forwardly from the base plate 15. These counterweights are locked by means of set screws 29 in such a position as to maintain the plate 15 in exact vertical alignment in all directions.

Also, in order to center the specimen 9 with the jaws 8 so that it is coaxial with the applied tensile force, a member 30 is secured to the open end of each of the body portions of the grips and this member includes a ledge 31 adapted to space the one edge of the test specimen 9 a distance from the face 20 of the base plate 15 such that the clamp portion of the specimen 9 is exactly centered between the front and rear faces of the grip or in other words is exactly centered relative to the forces applied thereto.

In the operation of the holder of the present invention, the upper and lower grips are respectively secured to the upper and lower tension supplying members of the test machine by means of the upper and lower universal joints 3 and 4 after which the counterbalances 26 are adjusted to bring the base plate 15 into a substantially vertical position. Thereafter the test specimen 9 is inserted in the jaws of the two grips in contact with members 30 and the jaws closed to secure the specimen. Since the plate 15 is in a vertical position and since the grips 1 and 2 are aligned by the plate with the grip 2 positioned axially below and in direct alignment with the grip 1, operation of the tensile machine applies a uniformly distributed tensile force to the test specimen 9 so as to produce uniform tensile stress distribution throughout the sample and hence uniform axial elongation at all portions thereof during test.

While there has been shown and described a particular embodiment of the present invention it will be understood that it is not limited thereto and is intended by the appended claims to cover all such modifications as fall within the true spirit and scope of the invention.

What we claim as new and desire to secure by Letters Patent of the United States is:

1. A specimen holder for a tensile testing machine having upper and lower relatively movable tension elements, said holder comprising a base plate having spaced, vertical grooves therein, a pair of axially aligned opposed grips including universal joint means for respectively connecting said grips to said elements, one of said grips being rigidly secured to one end of said base plate, the other of said grips being slidably mounted in said grooves for movement relative to said one of said grips, and means for retaining said other of said grips in engagement with said grooves, said grips including jaws for anchoring the specimen in parallel alignment with said grooves, said holder including counterweight means for counterbalancing the weight of said plate to maintain said plate in vertical alignment with the axis of movement of said tension elements.

2. In combination with a universal testing machine including relatively movable upper and lower tension producing elements and upper and lower specimen grips respectively connected to said elements by universal joint means, means for maintaining said grips in axial alignment during testing of a specimen gripped thereby comprising a plate rigidly secured at one end thereof to the rear surface of said upper grip and guide means for slidably supporting said lower grip on said plate for axial movement thereof relative to said upper grip, said guide means including grooves in said plate parallel to the axis of said specimen and spaced runners on said lower grip slidably received in said grooves, and means for counterbalancing the weight of said plate to maintain said plate in parallel alignment with the axis of movement of said tension producing elements.

References Cited by the Examiner

UNITED STATES PATENTS

| | | | |
|---|---|---|---|
| 2,136,344 | 11/1938 | Kochheiser et al. | 73—95 |
| 2,363,930 | 11/1944 | Basquin | 73—97 |
| 2,447,660 | 8/1948 | Miklowitz | 73—103 |

RICHARD C. QUEISSER, *Primary Examiner.*

J. H. WILLIAMSON, *Assistant Examiner.*